Feb. 28, 1939.   H. F. GUNDLACH   2,148,426
AUTOMATIC SHAVER INDICATOR
Filed Oct. 12, 1937
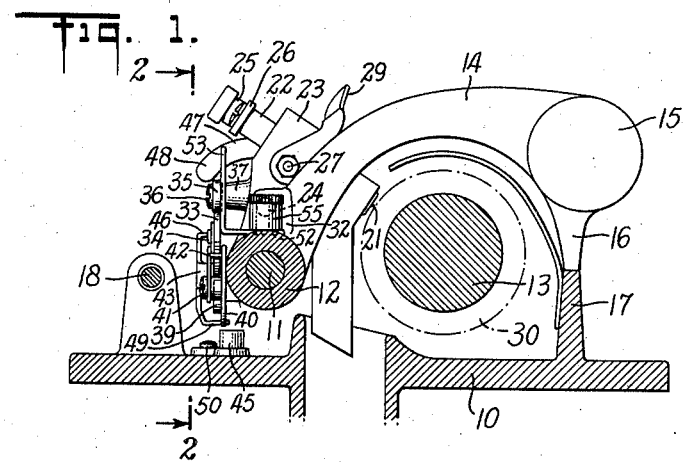
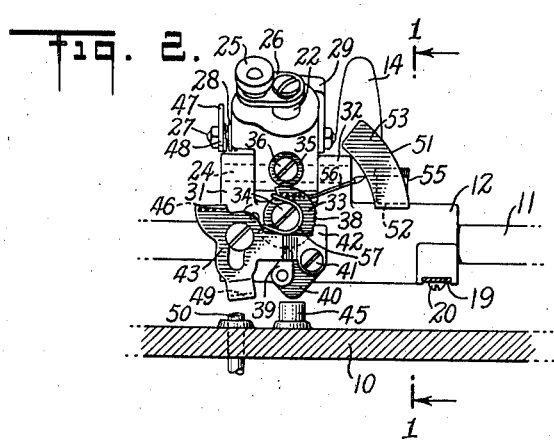
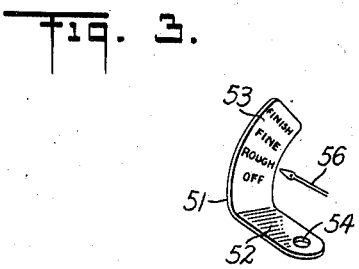
INVENTOR
Howard F. Gundlach
BY
Blair, Curtis, Dunne + Hayward
ATTORNEYS Patented Feb. 28, 1939

2,148,426

UNITED STATES PATENT OFFICE 2,148,426

AUTOMATIC SHAVER INDICATOR

Howard F. Gundlach, Cleveland, Ohio, assignor to Dictaphone Corporation, New York, N. Y., a corporation of New York Application October 12, 1937, Serial No. 168,550

2 Claims. (Cl. 82—1.1)

This invention relates to machines for shaving or otherwise resurfacing record blanks intended for use in dictating machines.

A well known type of record resurfacing machine comprising a frame, a rotatable record supporting mandrel mounted on the frame and a tool carriage adapted to be moved longitudinally of the frame over a record supported by the mandrel, is shown and fully described in U. S. Patent No. 1,740,425.

In the machine of the patent mentioned, means is provided for quickly locating and locking the record resurfacing tool with respect to the record in proper position for taking a first or roughing cut of predetermined depth. Means is also provided for automatically resetting the resurfacing tool for one or more fine or finishing cuts of predetermined depth, to be taken after the first or roughing cut has been made. Associated with these means there is also provided means for causing the return of both the record engaging tool and the tool resetting mechanism to normal position by a single manual operation.

An object of the present invention is to provide means for indicating at all times the position of the tool in relation to the record blank so that the operator may tell at a glance whether the tool occupies an inoperative position; or is set for taking a roughing cut or any one of several successive fine or finishing cuts.

A further object is to provide indicating means adapted to be automatically advanced from one position to another as the tool is correspondingly advanced, and to be automatically restored to a normal or "off" position when the tool and tool advancing mechanism are returned to their respective normal positions.

A further object is to provide simple and reliable indicator elements adapted for ready attachment to machines of the character described.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of my invention—

Fig. 1 is a transverse sectional view of a record surfacing machine taken on line 1—1 of Fig. 2 showing the automatic step-by-step tooth or knife advancing means and the knife position indicating means cooperatively associated therewith;

Fig. 2 is a cross-section taken on line 2—2 of Fig. 1;

Fig. 3 is a perspective detail view of the fixed element of the indicating device.

Similar reference characters refer to similar parts throughout the various views of the drawing.

The resurfacing machine comprises a frame 10. Supported thereon is a carriage guide rod 11 along which the bearing sleeve 12 of a knife bar carriage 14 is adapted to slide, with its axis parallel to a mandrel shaft 13 which is rotatably mounted in the said frame and is adapted to support a record blank 30. The carriage arches forwardly from the sleeve 12 to a point where it is provided with a ball-shaped weight and hand piece 15. Below the hand piece the carriage is provided with a shoe 16 which, during the operation of the machine, slides along a front rail 17 forming part of the frame.

A rotatable feed screw 18 mounted on the frame is adapted to be engaged by a segmental feed nut (not shown) when the shoe 16 rests upon the rail 17. When the front of the carriage is lifted by grasping the hand piece 15, the feed nut is lowered out of contact with the feed screw and the carriage is free to be manually moved from end to end of the guide rod. The said feed nut is carried at the end of a leaf spring 19 secured to the carriage sleeve as by a machine screw 20. It will be understood that the feed screw and mandrel may be simultaneously driven at appropriate relative speeds by any suitable drive connections from any source of power. Preferably an electric motor is used. The record blank supported upon the rotating mandrel is shaved in the usual manner by means of a knife 21 with which the carriage is equipped, while the carriage is traveling from one end of the guide rod to the other, impelled by the feed screw. The knife 21, usually formed of sapphire or other hard stone, is mounted at the forward end of a knife bar 22 slidably mounted in a housing or carrier 23, pivotally supported as at 24 upon the carriage 14. The knife-bar carrier is urged rearwardly, that is, away from the mandrel 13 to a limit position by resilient means (not shown). The knife bar 22 and the carrier 23 are adapted to be moved together and relatively so as to bring the knife into contact with the record surface.

In order to set the knife to take a first or roughing cut from a record blank, the knife bar may be so set that the knife will extend into the record material only a predetermined amount. This amount or depth of cut is determined by means of a gauge bar 25 mounted in the knife bar carrier 23 and adapted to slide in a path parallel to that of the knife bar. The gauge and knife bar are tied together by a tie bar 26 for movement together toward and from the record surface, so that, when projected forwardly toward the record blank, the end of the gauge will engage the record surface and limit the depth to which the knife may penetrate the record blank material. These parts are usually so related that when set by the gauge the knife extends beneath the record surface substantially .00075 of an inch. This amount with an additional advance of .0005 of an inch obtained by the knife advancing means, hereinafter described, represents the depth of the first or roughing cut.

To hold the knife bar 22 in any manually adjusted position, means for locking the knife bar in the carrier 23 is provided. This means comprises, in the form shown, a shaft 27 mounted to rock in the carrier and extending transversely of the knife bar. This shaft has a cam section (not shown) adapted to jam and lock the knife bar in any set position, in a well known manner, when the shaft is rotated against the tension of a spring 28 by means of a finger lever 29 rigidly secured to said shaft. When the cam is released by a slight movement of the finger lever in the opposite direction, that is, in a clockwise direction as shown in Fig. 1, the spring turns the cam-shaft to take the cam out of contact with the knife bar, after which the knife bar and gauge 25 are returned to their original positions by suitable spring means enclosed within the carrier housing 23. The gauge bar 25 is arranged to follow the knife bar 22 as the carriage travels to cut a record. Thus the knife bar is set to take a first or roughing cut when the carriage is at the end of its travel after finishing a shaving operation.

Since the first cut is seldom sufficient properly to finish the record surface, means is provided for automatically advancing the knife 21 toward the record blank 30 a predetermined extent incident to moving the carriage to a starting position of travel. Accordingly, as said above, the knife bar carrier 23 is pivotally mounted on shaft 24 in a pair of lugs 31, 32 formed on the carriage 14. Normally the carrier is urged rearwardly by resilient means mounted in the carriage frame. The step-by-step advance movement of the carrier against said resilient means is accomplished through the employment of a disc 33 mounted on a stud 34 on the carriage 14. This cam disc cooperates with a roller 35 mounted on a stud 36 carried by a boss 37 on the carrier 23.

On the cam disc is a series of ratchet teeth 38 adapted to be engaged by a feed pawl 39 pivotally mounted on a pawl carrier 40, the latter pivoting on a stud 41 upon the carriage 14. The ratchet teeth 38 are also engaged by a back-check pawl 42 pivotally mounted on the stud 41 and normally urged by the weight of a gravity arm 43 into engagement with the ratchet teeth to prevent return movement of the cam disc 33 by the reaction of a spring (not shown).

In order that the cam disc 33, and hence the knife 21, may be moved step-by-step to successive positions to effect successive fine or finishing cuts as an incident to the movement of the carriage to starting position, the carrier 40 for the feed pawl 39 is arranged to overlie a projection 45 extending upwardly from the base of the frame 10 when the carriage is in the position it attains at the end of a shaving operation. This is the position illustrated in the drawing. When the carriage 14 is raised by means of the hand piece 15 from the position shown rotatably on the carriage rod 11, the lower portion of the pawl carrier 40 engages the projection 45 on the frame and causes the pawl 39 to move the cam disc 33 an amount which in practice is equal to the distance between two ratchet teeth, the pawl rotating about its pivot against the tension of a spring (not shown). During this movement of the cam disc one or more of the teeth thereon pass the back-check pawl 42 and the latter then prevents the return of the cam disc 33 to its original position.

The upward swinging of the carriage by hand is necessary to permit movement thereof to starting position, for by such swinging movement the carriage feed nut is removed from engagement with the feed screw, and the knife bar 22 and gauge 25 are moved away from the record blank. During the sliding of the carriage to starting position, the feed pawl carrier 40 slides off the projection 45 and is returned to its normal position by a suitable spring (not shown). If the first fine cut is not sufficient to provide a satisfactory recording surface, additional fine cuts may be obtained by repeating the tool advancing operation. It will be understood, therefore, that the knife is automatically advanced toward the record blank to take a succession of fine cuts by successive rotative movements of the knife bar carrier.

After the record has been satisfactorily shaved, the knife bar 22 and knife bar carrier 23 with the step-by-step advancing means, comprising the cam disc 33, are returned to normal position so that the knife may later be manually set to take a first or rough cut from another record. To do this, the lever 29 is operated to rotate the cam-shaft 27 and thus release the knife bar 22. When released, the knife bar is returned to inoperative position by its spring; at the same time the knife bar advancing cam disc 33 is released so as to permit its return to normal position by its spring through the disengagement of the back-check pawl 42 from the ratchet teeth 38. This double release is accomplished in the following manner: The gravity arm 43 of the back-check pawl is provided with a horizontally extending lug 46. On the end of the cam-shaft 27 opposite to that upon which is fixed the finger lever 29, there is rigidly mounted a rearwardly and downwardly extending curved arm 47 the rearward end 48 of which is adapted to overlie the lug 46 and be spaced therefrom a short distance when the shaft 27 has been rocked in a counter-clockwise direction to effect locking of the knife bar and when the back-check pawl arm 43 occupies its lower position as shown in the drawing.

The gravity arm 43 is also provided with a depending and horizontally extending lug 49 which in its normal lowered position just overlies the upper end of a plunger 50 mounted for vertical movement in the base of the frame. This plunger is so related to an end gate (not shown) of the machine that when the end gate is opened to permit the removal of a record blank from the mandrel, the plunger is elevated thus causing its upper end to lift the gravity arm 43. For a full description of the end gate construction mentioned, reference should be had to the above cited patent. The raising of the gravity arm 43 disengages the back-check pawl, and the cam disc returns to its normal position. Coordinately the lug 46 on the gravity arm engages the rear end 48 of arm 47 and effects sufficient movement thereof to release the locking cam from its binding engagement with the knife bar, when immediately the cam-shaft 27 is rotated by its spring to its normal position, as shown in the drawing, and the knife bar assume its normal inoperative position.

No claim of novelty is made in respect to the resurfacing machine organized as above described, for a more comprehensive description of which reference should be made to the above mentioned Patent 1,740,245. For slightly different but similar constructions, reference may be had to U. S. Patents 1,723,569 and 1,726,859.

As stated above, one of the objects of the present invention is to provide indicating means for showing the setting of the tool or knife. In its present embodiment this means comprises a member fixed in relation to the carriage and a movable pointer member adapted to play over a part of the fixed member to indicate by pointing at certain marks, words or other indicia the position occupied by the tool. As discussed herein, the fixed member comprises a plate having a horizontal portion 52 and a substantially vertical portion 53. The horizontal portion is provided with a hole 54 of sufficient size to let pass therethrough the nipple end of an oil-cup fitting 55 which is a standard part of the shaver carriage equipment. When the oil-cup fitting is screwed down in place, the fixed indicator element 52 is held in such a position that the indicia thereon are directly before the eyes of the operator. In order that the movable element of this indication device may show at all times the set position of the tool, it is coordinated with the advancing mechanism and specifically in the present embodiment thereof with the cam disc 33. The pointer indicated by the reference numeral 56 consists of a piece of resilient rod or wire having a portion passing back of the cam disc as seen in Fig. 2, then a forwardly extending portion which lies against a shoulder of the cam disc and connects with a loop portion 57 adapted to pass snugly about the stud bolt 34. At the end of this loop portion the wire rod is turned back to the other side of the disc, this portion lying against another shoulder of the cam disc. Thus the pointer is held rigidly in respect to the cam disc and is forced to move therewith. As illustrated, near the bottom of the vertical portion 53 of the fixed indicator part or element, there appears the word "Off"; slightly above this the word "Rough"; above this again the word "Fine"; and near the top of the portion 53 there appears the word "Finish." The pointer is so positioned in its attachment to the cam disc that its indicating end will point at "Off" when the cam occupies its inoperative position as shown in Fig. 2. After the knife bar has been pressed down by hand so that the knife enters the wax of the record cylinder, the carriage is lifted and moved back to starting position. As said above, this advances the knife a short distance and the pointer will then occupy a position pointing at the word "Rough". Now after the completion of a roughing cut, should a fine cut be necessary the carriage is lifted and returned to its starting position again thus advancing the knife, and correspondingly the pointer 56 of the indicating device is moved to point at the word "Fine." A repetition of these operations will bring the pointer to the word "Finish." It will be understood, of course, that more positions may be provided for and proper markings provided therefor on the plate 51. It will also be understood that the invention is not limited in its application to a shaving machine of the construction shown, it being only necessary, to accomplish the purpose of and the functions claimed as objects of the invention, that the movable element of the device be so incorporated in the machine that it will not only move forwardly from position to position in correspondence with the advance of the knife, but that also when the knife is released to return to its original inoperative position the pointer or other movable member of the indicating device will be moved back to its original position. It will be seen, therefore, that the present invention provides simple and efficient means for indicating the state of the shaving machine in respect to the setting of the tool at any stage of operation, and that a device has been provided which may be readily made a part of any machine for which it is designed and that the elements of the device may be varied in shape and construction to accommodate themselves for use with various types of shaving machines.

I claim:

1. In a machine for resurfacing cylindrical sound records wherein a cutting tool is provided for cutting the record, and means for setting said tool for a first cut and means for automatically resetting said tool for successive fine cuts is provided to cooperate with said tool, said resetting means including a rotatable element, an indicating device including a member attached to said rotatable element and providing a pointer extending beyond the periphery of said element, and a member bearing tool position indications mounted in fixed operative relation to said pointer.

2. In a machine for resurfacing cylindrical sound records wherein a cutting tool is provided for cutting the record, and means for setting said tool for a first cut and means for automatically resetting said tool for successive fine cuts is provided to cooperate with said tool, said resetting means including a rotatable element, an indicating device including a member adapted to be sprung into operative relation with said element to rotate therewith and providing a pointer extending beyond the periphery of said element, and a member bearing tool position indications mounted in fixed operative relation to said pointer.

HOWARD F. GUNDLACH.